United States Patent
Chen et al.

(10) Patent No.: US 11,128,223 B1
(45) Date of Patent: Sep. 21, 2021

(54) METHODS AND SYSTEMS OF VARIABLE DELAY TIME IN POWER CONVERTERS

(71) Applicant: SEMICONDUCTOR COMPONENTS INDUSTRIES, LLC, Phoenix, AZ (US)

(72) Inventors: Gang Chen, Tai Po (HK); Marian Poncik, Newcastle West (IE); Kieran Burke, Quin (IE)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 19 days.

(21) Appl. No.: 16/804,560

(22) Filed: Feb. 28, 2020

(51) Int. Cl.
*H02M 3/335* (2006.01)
*H02M 1/08* (2006.01)
*H02M 1/00* (2006.01)

(52) U.S. Cl.
CPC ....... *H02M 3/33584* (2013.01); *H02M 1/083* (2013.01); *H02M 1/0009* (2021.05)

(58) Field of Classification Search
CPC ......... H02M 3/33592; H02M 3/33576; H02M 3/33584; H02M 1/08; H02M 1/083; H02M 1/0003; H02M 1/0009; H02M 7/515; H02M 2001/0058
See application file for complete search history.

(56) References Cited

U.S. PATENT DOCUMENTS

| | | | | |
|---|---|---|---|---|
| 6,657,417 B1* | 12/2003 | Hwang | ..................... | G05F 1/70 323/207 |
| 8,605,464 B2* | 12/2013 | Sase | .................... | H02M 1/4258 363/21.02 |
| 10,250,119 B1 | 4/2019 | Chen et al. | | |
| 2019/0207527 A1* | 7/2019 | Norisada | ............... | H02M 7/797 |

OTHER PUBLICATIONS

"General TI High Voltage Evaluation User Safety Guidelines," Texas Instruments Product Publication No. SNVU520B—May 2016-Revised Oct. 2017, 22 pages, copyright 2016-2017 Texas Instruments Incorporated.
Liu, Yan-Fei et al, "A New Current Sensing Scheme for Zero-Voltage Switching Phase-Shifted Bridge Converter," IEEE Publication 0-7803-6407-4/00, pp. 567-573.

* cited by examiner

*Primary Examiner* — Adolf D Berhane
(74) *Attorney, Agent, or Firm* — Dickinson Wright PLLC; Mark E. Scott

(57) ABSTRACT

Variable delay time in power converters. At least some example embodiments are methods of operating a power converter, the methods comprising: inducing, by a converter controller, a positive voltage and a positive current on a secondary winding of a transformer of a power converter, the inducing by a bridge circuit coupled to a primary winding of the transformer; creating, by the converter controller, a first ramp signal proportional to the positive current; sensing a first inductor current through a first inductor, the first inductor coupled between the secondary winding and a load, and the sensing creates a signal indicative of the (Continued)

first inductor current; and changing conductive state of a first freewheeling switch from conductive to non-conductive when a magnitude of the first ramp signal crosses a magnitude of the signal indicative of the first inductor current.

20 Claims, 8 Drawing Sheets

METHODS AND SYSTEMS OF VARIABLE DELAY TIME IN POWER CONVERTERS

CROSS-REFERENCE TO RELATED APPLICATIONS

Not Applicable.

BACKGROUND

Current-doubler power converts may be used in a variety of situations. One such situation is reducing voltage from a distribution bus (e.g., 48 V) to supply individual high-performance computer systems at low voltage (e.g., 1 V) but with high current. In order to increase efficiency, freewheeling diodes in the secondary of the converter may be replaced with transistors (e.g., field effect transistors (FETs)) whose fully conductive resistance and voltage drop is less than the forward voltage drop of a freewheeling diode.

However, when using transistors in place of freewheeling diodes, the circuit designer is careful to ensure the transistors are not exposed to voltages higher than the blocking capacity of the transistors. The circuit designer may either select transistors with higher blocking capacity to address transient high voltage conditions, or the circuit designer may use transistors with lower blocking capacity and include clamp circuits (that have their own transistors and capacitor).

When using transistors in the place of freewheeling diodes, and also when using clamp circuits, it is beneficial to the overall efficiency of the current-doubler power converter to switch (i.e., change conductive state) transistors when there is reduced current through the transistors, or when there is reduced voltage across the transistors. This reduced current/voltage switching is sometimes referred and Zero Voltage Switching (ZVS) or Zero Current Switching (ZCS), though the switching need not take place precisely at zero for the benefit to accrue.

BRIEF DESCRIPTION OF THE DRAWINGS

For a detailed description of example embodiments, reference will now be made to the accompanying drawings in which.

DEFINITIONS

Various terms are used to refer to particular system components. Different companies may refer to a component by different names—this document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct connection. Thus, if a first device is coupled to a second device, that connection may be through a direct connection or through an indirect connection via other devices and connections.

In relation to electrical devices (whether stand alone or as part of an integrated circuit), the terms "input" and "output" refer to electrical connections to the electrical devices, and shall not be read as verbs requiring action. For example, a comparator (such as an operational amplifier) may have a first input and a second input, and these "inputs" define electrical connections to the comparator, and shall not be read to require inputting signals to the comparator.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Various example embodiments are directed to methods and systems of implementing variable delay time in power converters. More particularly, various example embodiments are directed to implementing variable delay between activation of switches of the primary side of the power converter, and activation of switches of the secondary side of the power converter, with the variable delay to implement reduced voltage switching of transistors and/or to implement reduced current switching of transistors. More particularly still, example embodiments are directed to implementing a variable delay, where the time duration of the variable delay in each switching cycle is based on the input voltage to the power converter and electrical current flow through an inductor of the secondary side. For example, when current flow in the secondary winding matches current flow in an inductor on the secondary side, current flow through a freewheeling switch will be low or zero, and thus changing the conductive state of the freewheeling switch can take place with greater overall efficiency. The application now turns to an example current-doubler converter.

Figure 1:
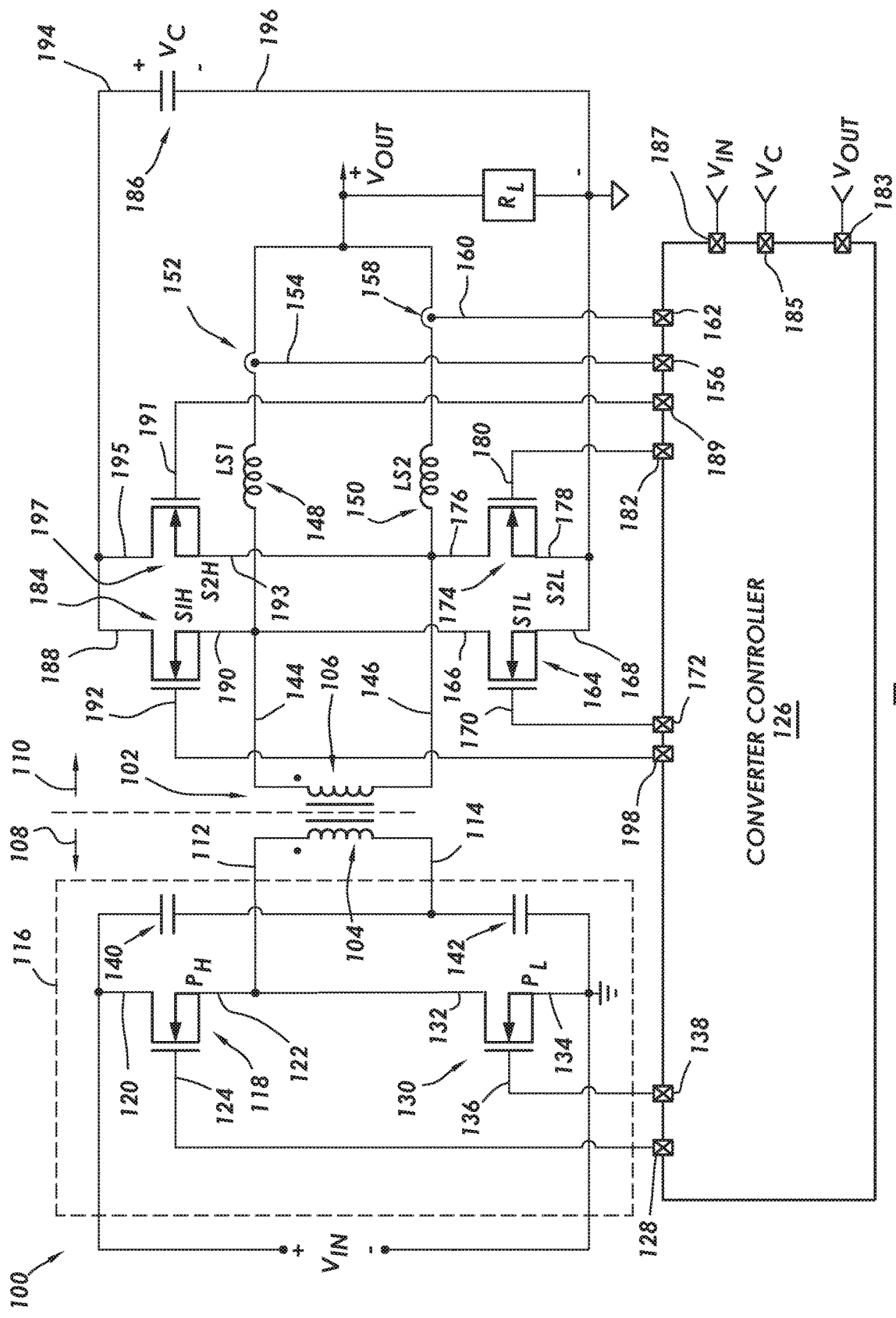
FIG. 1 shows a circuit diagram of a current-doubler converter in accordance with at least some embodiments.

FIG. 1 shows circuit diagram of a current-doubler converter 100 in accordance with at least some embodiments. In particular, the power converter in the example form of current-doubler converter 100 comprises a transformer 102 that defines a primary winding 104 and a secondary winding 106. The transformer 102 may consist of leakage inductance, magnetizing inductance, and even external inductors in series with its primary winding and/or secondary winding. The transformer 102 conceptually creates a primary side 108 and a secondary side 110. The conceptual division between the primary side 108 and the secondary side 110 is an electrical concept, and not necessarily a physical concept. In the example current-doubler converter 100, the primary side 108 could be electrically isolated from the secondary side 110, but electrical isolation is not required in all cases.

Turning to the primary side 108, the example primary side 108 comprises an input voltage $V_{IN}$ that defines a positive node (shown as "+" in the figure) and a negative or return node (shown as "−" the figure). In the example, the input voltage $V_{IN}$ is a direct current (DC) voltage from any suitable source (e.g., a DC distribution bus, a rectified alternating current (AC) voltage). The primary winding 104 defines a first lead 112 and a second lead 114. The first lead 112 and second lead 114 are selectively coupled to the input voltage $V_{IN}$ by way of a bridge circuit 116. The bridge circuit 116 is designed and constructed to apply the AC signal to the primary winding 104. The example bridge circuit 116 shows a half-bridge configuration, but any suitable configuration may be used (e.g., a full-bridge configuration, a clamped full-bridge configuration).

The example bridge circuit 116 comprises a primary high-side electrically controlled switch 118. The primary high-side electrically controlled switch 118 may take any suitable form (e.g., a field effect transistor (FET), or a bipolar junction transistor). In the example case of FIG. 1, the primary high-side electrically controlled switch 118 is a FET, and hereafter is referred to as Primary High FET (PH FET 118). The example PH FET 118 defines a drain 120, a source 122, and a gate 124. The drain 120 is coupled to the input voltage $V_{IN}$. The source 122 is coupled to the first lead 112 of the primary winding 104. The gate 124 is coupled to a converter controller 126 by way of a primary high-drive terminal 128 (PH drive terminal 128). Thus, the converter controller 126 selectively makes the PH FET 118 conductive and non-conductive by driving the gate 124.

The example bridge circuit 116 also comprises a primary low-side electrically controlled switch 130. The primary low-side electrically controlled switch 130 likewise may take any suitable form. In the example case of FIG. 1, the primary low-side electrically controlled switch 130 is a FET, and hereafter is referred to as Primary Low FET (PL FET 130). The example PL FET 130 defines a drain 132, a source 134, and a gate 136. The drain 132 is coupled to the first lead 112 of the primary winding 104. The source 134 is coupled to common or ground on the primary side 108. The gate 136 is coupled to the converter controller 126 by way of a primary low-drive terminal 138 (PL drive terminal 138). Thus, the converter controller 126 selectively makes the PL FET 130 conductive and non-conductive by driving the gate 136.

Still referring to FIG. 1, the example bridge circuit 116 further includes a capacitor 140 and a capacitor 142. Capacitor 140 is coupled between the input voltage $V_{IN}$ and the second lead 114 of the primary winding 104. Capacitor 142 is coupled between the second lead 114 of the primary winding 104 and common or ground on the primary side 108.

In operation, the example bridge circuit 116 applies an AC signal to the primary winding 104 by making the PH FET 118 conductive, and making the PL FET 130 non-conductive. Electrical current thus flows from the input voltage $V_{IN}$, through the PH FET 118, through the primary winding 104, and then to capacitor 142. During the example conduction time of the PH FET 118, a voltage and current is induced in the secondary winding 106 with polarity as shown by the dot convention in the figure. Thereafter, and with timing based the energy to be provided across the transformer 102, the PH FET is made non-conductive. Later still, again with timing based on the energy to be provided, the PL FET 130 is made conductive and the PH FET 118 is held non-conductive. Electrical current thus flows from the capacitor 142, through the primary winding 104, through the PL FET 130, and then to common or ground on the primary side 108. During the example conduction time of the PL FET 130, a voltage and current is induced in the secondary winding 106 with polarity again as shown by the dot convention in the figure. At some point, again based on the energy to be provided across the transformer 102, the PL FET 130 is made non-conductive. As can be seen from FIG. 1, a bridge circuit 116 in the form of a half-bridge has a 50% duty cycle limitation to prevent both the PH FET 118 and PL FET 130 from being simultaneously conductive, thus causing a condition known as shoot through in which the input voltage $V_{IN}$ is shorted.

For purposes of later discussion, a voltage on the secondary winding 106 that produces electrical current flowing out of the lead associated with the dot convention (e.g., in FIG. 1 the first lead 144) will be referred to as a positive voltage and a corresponding positive current. Oppositely, a voltage on the secondary winding 106 that produces electrical current flowing into the lead associated with the dot convention (e.g., in FIG. 1 the second lead 146) will be referred to as a negative voltage and a corresponding negative current. However, the designation is arbitrary and should not be read as a limitation. Following the designation and the circuit of FIG. 1, the voltage and current induced in the secondary winding 106 when the PH FET 118 is conductive is referred to as a positive voltage and a positive current. And oppositely, the voltage and current induced in the secondary winding 106 when the PL FET 130 is conductive is referred to as a negative voltage and a negative current.

Still referring to FIG. 1, the example secondary side 110 defines an output voltage VOUT having a positive node and a common or return on the secondary side 110. FIG. 1 shows an example load $R_L$ coupled across the output voltage VOUT. In many cases, an output capacitor is electrically coupled in parallel with the load $R_L$, but the output capacitor is omitted so as not to further complicate the figure. The secondary winding 106 defines the first lead 144 and the second lead 146. The first lead 144 is coupled to the positive node of the output voltage VOUT by way of an inductor 148. As the inductor 148 is associated with the S1H and S1L FETs, the inductor 148 is hereafter referred to as the LS1 inductor 148. The second lead 146 is coupled to the positive connection of the output voltage VOUT by way of an inductor 150. As the inductor 150 is associated with the S2H and S2L FETs, the inductor 150 is hereafter referred to as the LS2 inductor 150. In steady-state operation, both the LS1 inductor 148 and the LS2 inductor 150 provide current to the load $R_L$.

An LS1 current sensor 152 is electrically disposed between the LS1 inductor 148 and the positive connection of the output voltage VOUT. The example LS1 current sensor 152 is shown as a current sense transformer, but the current sensor may take any suitable form (e.g., small sense resistor and differential amplifier). The LS1 current sensor 152 defines a sense output 154 that is coupled to the converter controller 126 by way of current sense terminal 156. Similarly, an LS2 current sensor 158 is electrically disposed between the LS2 inductor 150 and the positive node of the output voltage VOUT. The example LS2 current sensor 158 is shown as a current sense transformer, but may take any suitable form. The LS2 current sensor 158 defines a sense output 160 that is coupled to the converter controller 126 by way of current sense terminal 162.

The example secondary side further defines a freewheeling electrically-controlled switch 164. The freewheeling electrically-controlled switch 164 may take any suitable form (e.g., a field effect transistor (FET), or a bipolar junction transistor). In the example case of FIG. 1, the freewheeling electrically-controlled switch 164 is a FET. So as not to unduly complicate the discussion, the freewheeling electrically-controlled switch 164 is hereafter referred to as the switch one lower FET (S1L FET 164). The S1L FET 164 defines a drain 166, a source 168, and a gate 170. The drain 166 is coupled to the first lead 144 of the secondary winding 106. The source 168 is coupled to ground or common on the secondary side 110. The gate 170 is coupled to the converter controller 126 by way of a freewheeling drive terminal (hereafter 51L drive terminal 172). During periods of time when a collapsing field around the LS1 inductor 148 provides current to the load $R_L$, the return path for the current to the LS1 inductor 148 is through the S1L FET 164.

The example secondary side further defines a freewheeling electrically-controlled switch 174. The freewheeling electrically-controlled switch 174 likewise may take any suitable form. In the example case of FIG. 1, the freewheeling electrically-controlled switch 174 is a FET. So as not to unduly complicate the discussion, the freewheeling electrically-controlled switch 174 is hereafter referred to as the switch two lower FET (S2L FET 174). The S2L FET 174 defines a drain 176, a source 178, and a gate 180. The drain 176 is coupled to the second lead 146 of the secondary winding 106. The source 178 is coupled to ground or common on the secondary side 110. The gate 180 is coupled to the converter controller 126 by way of a freewheeling drive terminal (hereafter S2L drive terminal 182). During periods of time when a collapsing field around the LS2 inductor 150 provides current to the load $R_L$, the return path for the current to the LS2 inductor 150 is through the S2L FET 174.

In operation of the current-doubler converter 100, there are certain operational conditions that create transient voltage spikes across the S1L FET 164 and the S2L FET 174. For example, during periods of time when the bridge circuit 116 is applying voltage to the primary winding 104, but where the current-doubler converter 100 is operating in a regenerative mode by transferring power in the reverse direction across the transformer 102 (i.e., transferring energy back to the input voltage $V_{IN}$) the S1L FET 164 and the S2L FET 174 may experience large voltage spikes. In order to reduce the voltage spikes experienced by the S1L FET 164 and S2L FET 174, the example secondary side 110 implements an active clamp system. In particular, the example secondary side 110 defines a clamp electrically-controlled switch 184 associated with the S1L FET 164. The clamp electrically-controlled switch 184 may take any suitable form (e.g., a field effect transistor (FET), or a bipolar junction transistor). In the example shown in FIG. 1, the clamp electrically-controlled switch 184 is a FET. So as not to unduly complicate the discussion, the clamp electrically controlled switch 184 is hereafter referred to as the switch one high FET (S1H FET 184). The example S1H FET 184 selectively couples a clamp capacitor 186 across the S1L FET 164 to absorb transient voltage spikes. In particular, the example S1H FET 184 defines a drain 188, a source 190, and a gate 192. The drain 188 is coupled to a first lead 194 of the clamp capacitor 186, and the second lead 196 of the clamp capacitor 186 is coupled to common or ground on the secondary side 110. The source 190 is coupled to the first lead 144 of the secondary winding 106, and thus is also coupled to the drain 166 of the S1L FET 164. The gate 192 is coupled to the converter controller 126 by way of a clamp drive terminal (S1H drive terminal 198).

The example secondary side 110 also defines a clamp electrically-controlled switch 197 associated with the S2L FET 174. The clamp electrically-controlled switch 197 likewise may take any suitable form. In the example case shown in FIG. 1, the clamp electrically-controlled switch 197 is a FET. So as not to unduly complicate the discussion, the clamp electrically-controlled switch 197 is hereafter referred to as the switch two high FET (S2H FET 197). The example S2H FET 197 selectively couples the clamp capacitor 186 across the S2L FET 174 to absorb transient voltage spikes. In particular, the example S2H FET 197 defines a drain 195, a source 193, and a gate 191. The drain 195 is coupled to the first lead 194 of the clamp capacitor 186. The source 193 is coupled to the second lead 146 of the secondary winding 106, and thus is also coupled to the drain 176 of the S2L FET 174. The gate 191 is coupled to the converter controller 126 by way of a clamp drive terminal (S2H drive terminal 189).

Still referring to FIG. 1, the S1L FET 164 and the companion S1H FET 184 are operated alternately. That is, when the S1L FET 164 is conductive, the S1H FET 184 is non-conductive, and vice versa. Stated from the standpoint of the converter controller 126, the converter controller 126 drives the S1L drive terminal 172 oppositely from the S1H drive terminal 198. In practice, there is small delay between de-assertion of the S1H drive terminal 198 and assertion of the S1L drive terminal 172, and vice versa, to reduce shoot through of the current from the clamp capacitor 186. Similarly, the S2L FET 174 and the companion S2H FET 197 are operated alternately. That is, when the S2L FET 174 is conductive, the S2H FET 197 is non-conductive, and vice versa. Again stated from the standpoint of the converter controller 126, the converter controller 126 drives the S2L drive terminal 182 oppositely from the S2H drive terminal 189. In practice, there is small delay between de-assertion of the S2H drive terminal 189 and assertion of the S2L drive terminal 182, and vice versa, to reduce shoot through of the current from the clamp capacitor 186.

The example converter controller 126 further defines an input voltage terminal 187 coupled to the positive node of the input voltage $V_{IN}$. As discussed more below, the magnitude of the input voltage $V_{IN}$ is used to control a variable time delay associated with changing conductive states of the FETs on the secondary side 110 relative to changing conductive states on the primary side. The example converter controller 126 defines a clamp voltage terminal 185 that is coupled to the first lead 194 of the clamp capacitor 186. As discussed more below, the magnitude of the input voltage $V_{IN}$ and the magnitude of the voltage $V_C$ on the clamp capacitor 186 are used to implement primary side overcurrent protection. Finally, the example converter controller 126 defines a feedback terminal 183 coupled to the positive node of the output voltage VOUT to control duty cycle of the drive signal applied to the FETs on the primary side 108.

Figure 2:
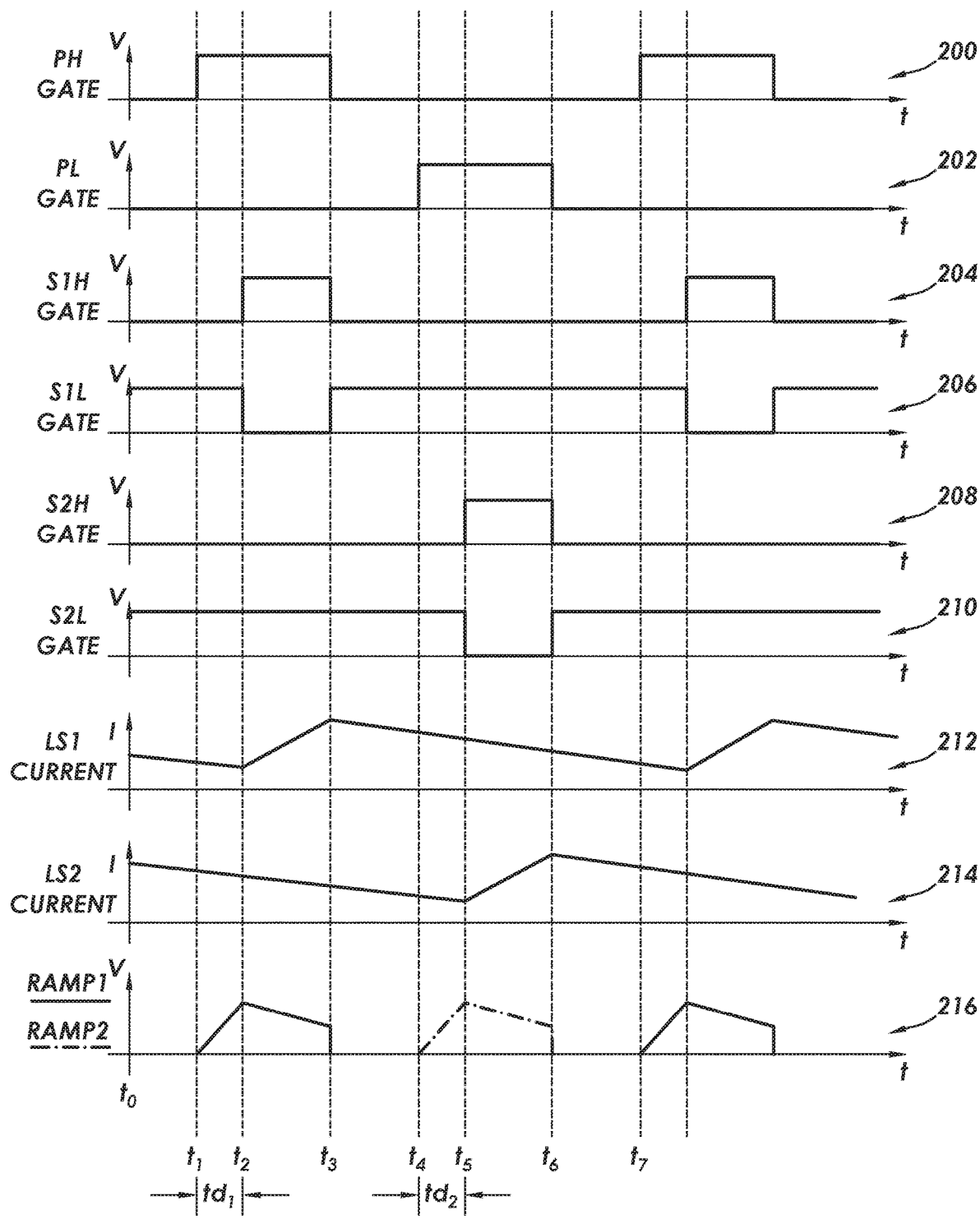
FIG. 2 shows a timing diagram in accordance with at least some embodiments.

FIG. 2 shows a timing diagram in accordance with at least some embodiments. In particular, FIG. 2 shows a plurality of Boolean and analog signals. The signals are not necessarily to scale in either magnitude or time; however, within the timing diagram time is aligned on the horizontal axis for each signal. FIG. 1 shows a plot 200 of the PH gate signal, a plot 202 of the PL gate signal, a plot 204 of the S1H gate signal, a plot 206 of the S1L gate signal, a plot 208 of the S2H gate signal, a plot 210 of the S2L gate signal, a plot 212 of the LS1 current signal, a plot 214 of the LS2 current signal, and a plot 216 of the ramp signals. The PH gate signal of plot 200 is an example signal driven to the gate 124 of the PH FET 118 by the PH drive terminal 128. The PL gate signal of plot 202 is an example signal driven to the gate 136 of the PL FET 130 by the PL drive terminal 138. The S1H gate signal of plot 204 is an example signal driven to the gate 192 of the S1H FET 184 by the S1H drive terminal 198. The S1L gate signal of plot 206 is an example signal driven to the gate 170 of the S1L FET 164 by the S1L drive terminal 172. The S2H gate signal in plot 208 is an example signal driven to the gate 191 of the S2H FET 197 by the S2H drive terminal 189. The S2L gate signal of plot 210 is an example signal driven to the gate 180 of the S2L FET 174 by the S2L drive terminal 182. The specification now turns to a description of operation of the example current-doubler converter 100 in time frames between t0 and t7 shown at the bottom of FIG. 2.

Figure 3:
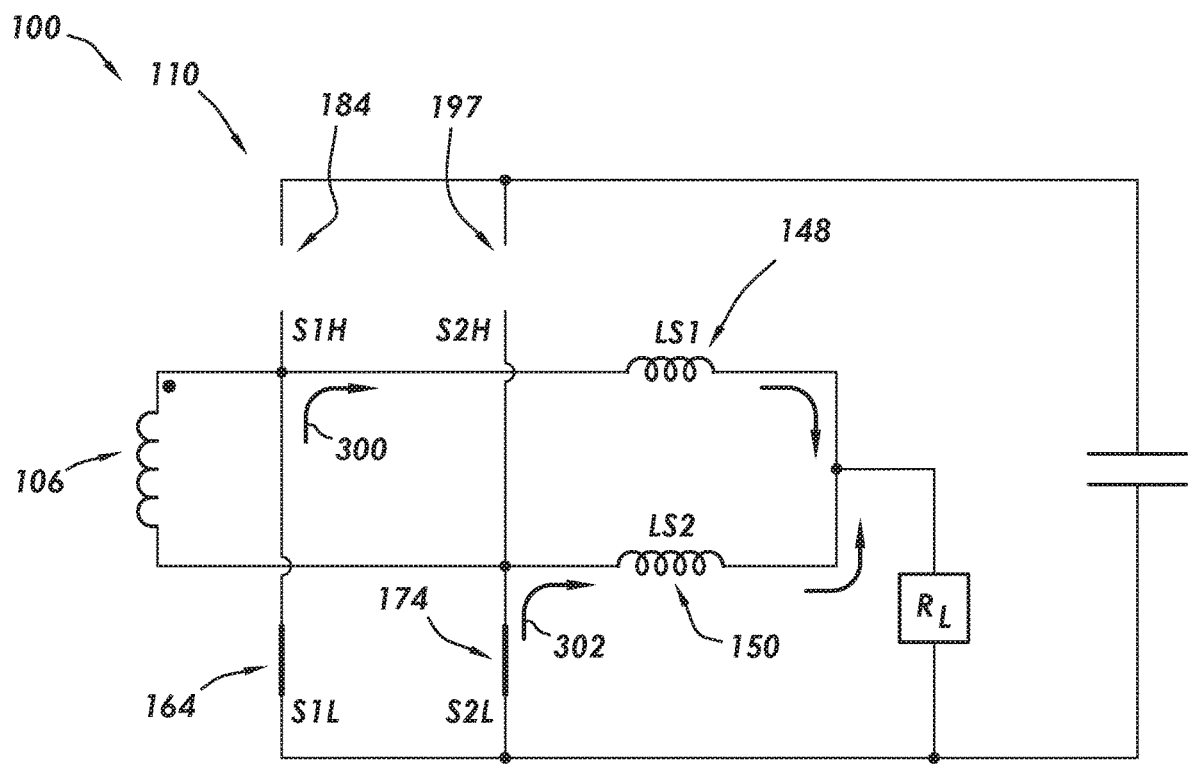
FIG. 3 shows a simplified circuit diagram of the secondary side of the current-doubler converter in accordance with at least some embodiments.

FIG. 3 shows a simplified circuit diagram of the secondary side 110 of the current-doubler converter 100 in accordance with at least some embodiments. Consider that the example current-doubler converter 100 is operating in a steady-state condition providing power to the load $R_L$. Referring simultaneously to FIGS. 2 and 3, FIG. 3 shows an example state of the secondary side 110 during the time period t0->t1 of FIG. 2. In FIG. 3, FETs that are conductive are shown as short circuits, and FETs that are non-conductive are shown as open circuits. During the example time period t0->t1, no voltage is induced on the secondary winding 106. Because of previous charging of the LS1 inductor 148 and LS2 inductor 150, both inductors are supplying current to the load $R_L$, as shown in plots 212 and 214 of FIG. 2. The LS2 current is higher, indicating that the LS2 inductor 150 was the most recently charged. The current provided by LS1 inductor 148 returns to the inductor by way of the S1L FET 164 as shown by arrow 300 representing current flow (hereafter current 300). Similarly, current provided by LS2 inductor 150 returns to the inductor by way of the S2L FET 174 as shown by current 302. As previously mentioned, when the S1L FET 164 is conductive its companion S1H FET 184 is non-conductive (and thus shown as an open circuit). And when the S2L FET 174 is conductive its companion S2H FET 197 is non-conductive (and thus shown as an open circuit).

Figure 4:
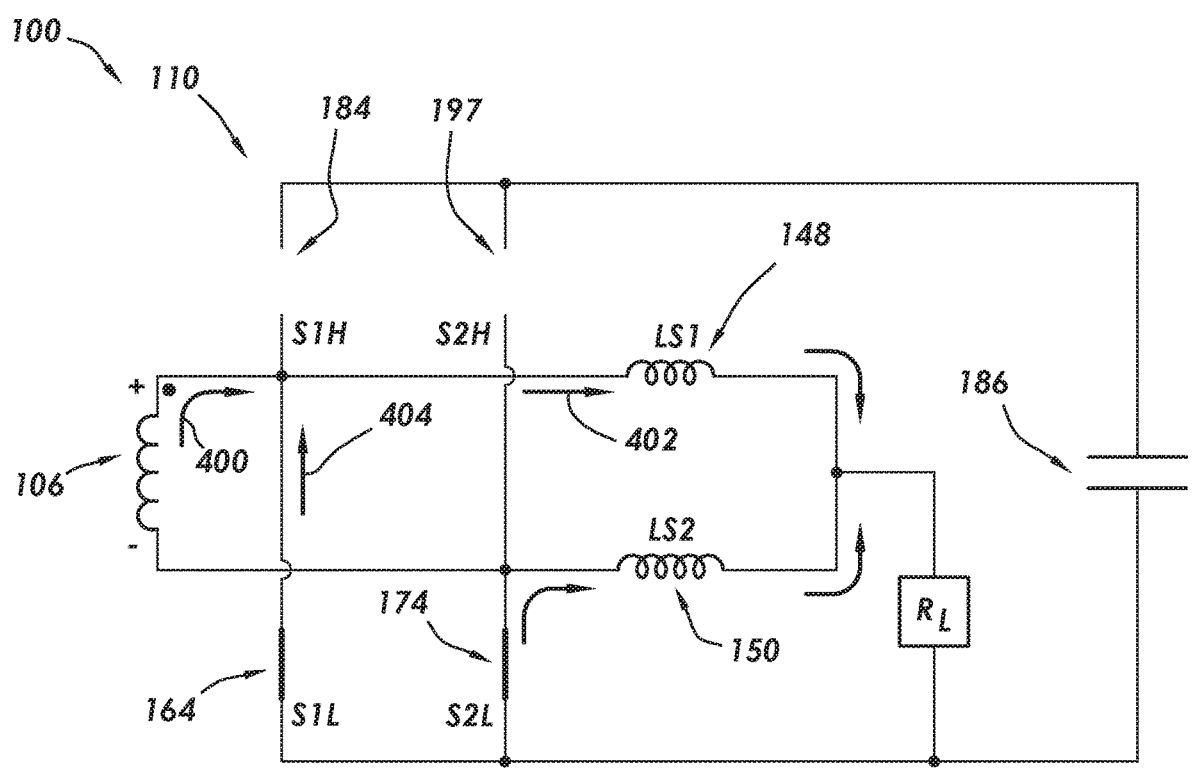
FIG. 4 shows a simplified circuit diagram of the secondary side of the current-doubler converter in accordance with at least some embodiments.

FIG. 4 shows a simplified circuit diagram of the secondary side 110 of the current-doubler converter 100 in accordance with at least some embodiments. Referring simultaneously to FIGS. 2 and 4, FIG. 4 shows an example state of the secondary side 110 during the time period t1->t2 of FIG. 2. As before, in FIG. 4 FETs that are conductive are shown as short circuits, and FETs that are non-conductive are shown as open circuits. In the example time frame, on the primary side the PH FET 118 (not shown) is conductive. However, because of the inductive aspects of the primary winding (e.g., leakage inductance), current flow through the secondary winding 106 ramps up over time.

In some related-art power converters, the state of the various FETs on the secondary side change simultaneously with the PH FET 118 becoming conductive. In particular, in some related-art power converters the S1L FET 164 is made non-conductive simultaneously with the PH FET 118 becoming conductive. And because the S1H FET 184 operates alternately from its companion S1L FET 164, in some related-art power converters the S1H FET 184 is made conductive simultaneously with the PH FET 118 becoming conductive. If one assumes the current though the secondary winding 106 is zero at the point in time t1, if the S1L FET 164 is made non-conductive at time t1 then all the current through the LS1 inductor 148 is interrupted. During high loads the current through the LS1 inductor 148 may be significant at time t1, and thus such switching is far from achieving zero-current switching. Similarly, if one assumes that the voltage on the secondary winding 106 about zero at time t1, if the S1H FET 184 is made conductive at time t1 then the S1H FET 184 switches at the full voltage held by the clamp capacitor 186, and thus such switching is far from achieving zero-voltage switching.

In yet still other related-art power converters, fixed delay times are implemented between the PH FET 118 becoming conductive and the S1L FET 164 becoming non-conductive (and the S1H FET 184 becoming conductive). However, fixed delay times are operable only for a very narrow set of operating conditions, and a change of one of the operating conditions results in the fixed delay time no longer being operable. For example, changes of input voltage $V_{IN}$ change the delay time, with lower input voltages resulting in longer delay times (all other parameters held constant) to achieve reduced voltage/current switching. As another example, changes in current provided to the load $R_L$ change the delay time, with higher current resulting in longer delay times (all other parameters held constant) to achieve reduced voltage/current switching. As yet another example, changes in the leakage inductance of the windings of the transformer (e.g., with age or operating temperature) change the delay time to achieve reduced voltage/current switching.

Returning to FIGS. 2 and 4, the current-doubler converter 100 in accordance with example embodiments implements a variable time delay $td_1$ between the PH FET 118 becoming conductive and the S1L FET 164 becoming non-conductive (and the S1H FET 184 becoming conductive). The variable time delay $td_1$ is the time between t1 and t2 in FIG. 2. In accordance with example cases, the configuration of FIG. 4 is maintained until the magnitude of the current 400 through the secondary winding 106 matches or is about the same as the magnitude of the current 402 through the LS1 inductor 148. When the magnitude of the current 400 through the secondary winding 106 matches or is about the same as the magnitude of the current 402 through the LS1 inductor 148, the current 404 through the S1L FET 164 is zero or close to zero. Moreover, in steady-state operation, when the magnitude of the current 400 through the secondary winding 106 matches or is about the same as the magnitude of the current 402 through the LS1 inductor 148, the voltage on the secondary winding 106 will be about the same as the voltage on the clamp capacitor 186. As will be discussed in greater detail below, in example embodiments the converter controller 126 (FIG. 1) creates a ramp signal proportional to the current 400 (designated as positive in the nomenclature from above). The converter controller 126 further senses the current 402 through the LS1 inductor 148, and the sensing creates a signal indicative of the LS1 inductor current. The converter controller 126 changes conductive state of the S1L FET 164 from conductive to non-conductive when a magnitude the ramp signal crosses the magnitude of the signal indicative of the first inductor current. The discussion continues with working through the remaining time periods of FIG. 2.

Figure 5:
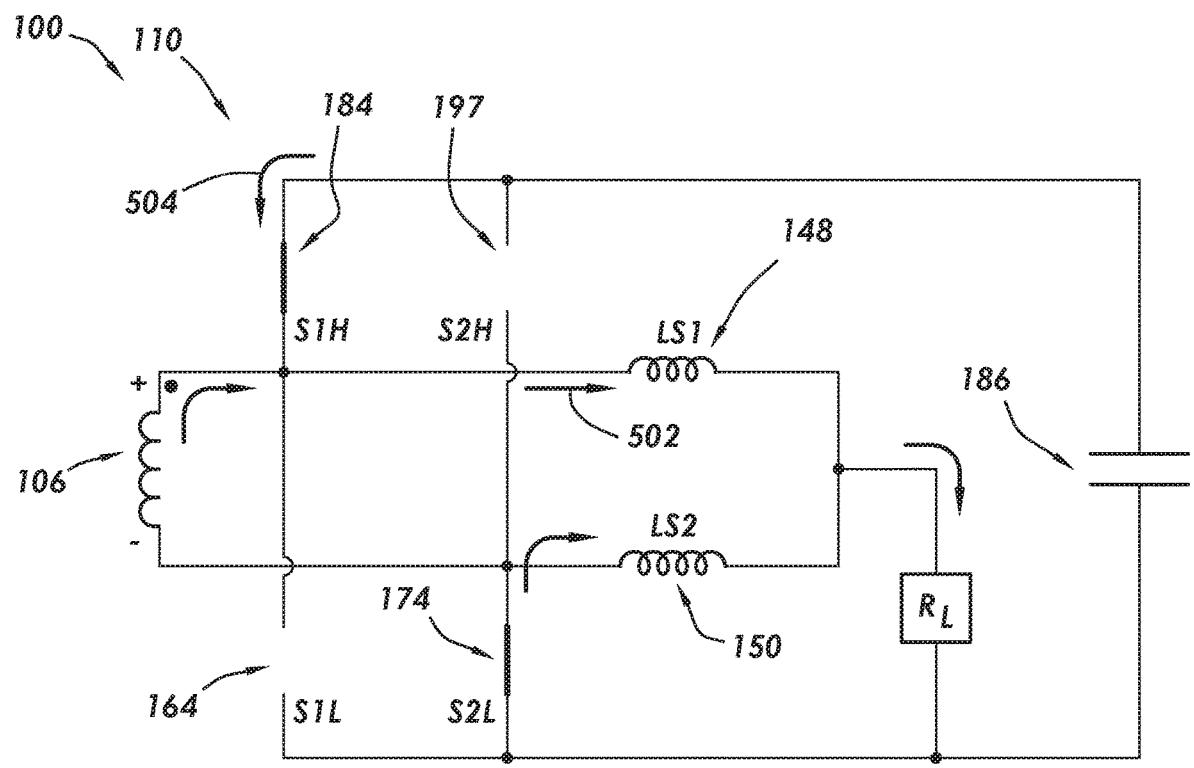
FIG. 5 shows a simplified circuit diagram of the secondary side of the current-doubler converter in accordance with at least some embodiments.

FIG. 5 shows a simplified circuit diagram of the secondary side 110 of the current-doubler converter 100 in accordance with at least some embodiments. Referring simultaneously to FIGS. 2 and 5, FIG. 5 shows an example state of the secondary side 110 during the time period t2->t3 of FIG. 2. In the example time period, the PH FET 118 is still conductive. However, the S1L FET 164 is non-conductive, the S1H FET 184 is conductive, and the S2L FET 174 remains conductive. Several actions take place in the example time period. In particular, the voltage across the secondary winding 106 (or the voltage across the clamp capacitor 186) charges or ramps up the current 502 through the LS1 inductor 148 (e.g., plot 212 of FIG. 2). Through the conduction of the S1H FET 184, the clamp capacitor 186 provides a current 504. Further, the field associated with the LS2 inductor 150 continues to collapse, and thus the LS2 inductor 150 continues to provide current to the load $R_L$ (e.g., plot 214 of FIG. 2). Thus, the current 506 provided to the load $R_L$ may comprise contributions from the both the LS1 inductor 148 (charged/boosted by the voltage across the secondary winding 106 or the voltage across the clamp capacitor 186) and the LS2 inductor 150. The amount of time that the example PH FET 118 remains conductive (e.g., the duty cycle of the PH gate signal in plot 200) is based on the output voltage of the current-doubler converter, having longer conductive times when output voltage is high, and shorter conductive times when output voltage is low. Stated otherwise, the duty cycle of the PH gate signal (plot 200) is shorter when output voltage is low, and longer when the output voltage is high, but nevertheless limited to 50% duty cycle as discussed above. Thus, the time t3 is controlled by the converter controller 126 based on load.

Figure 6:
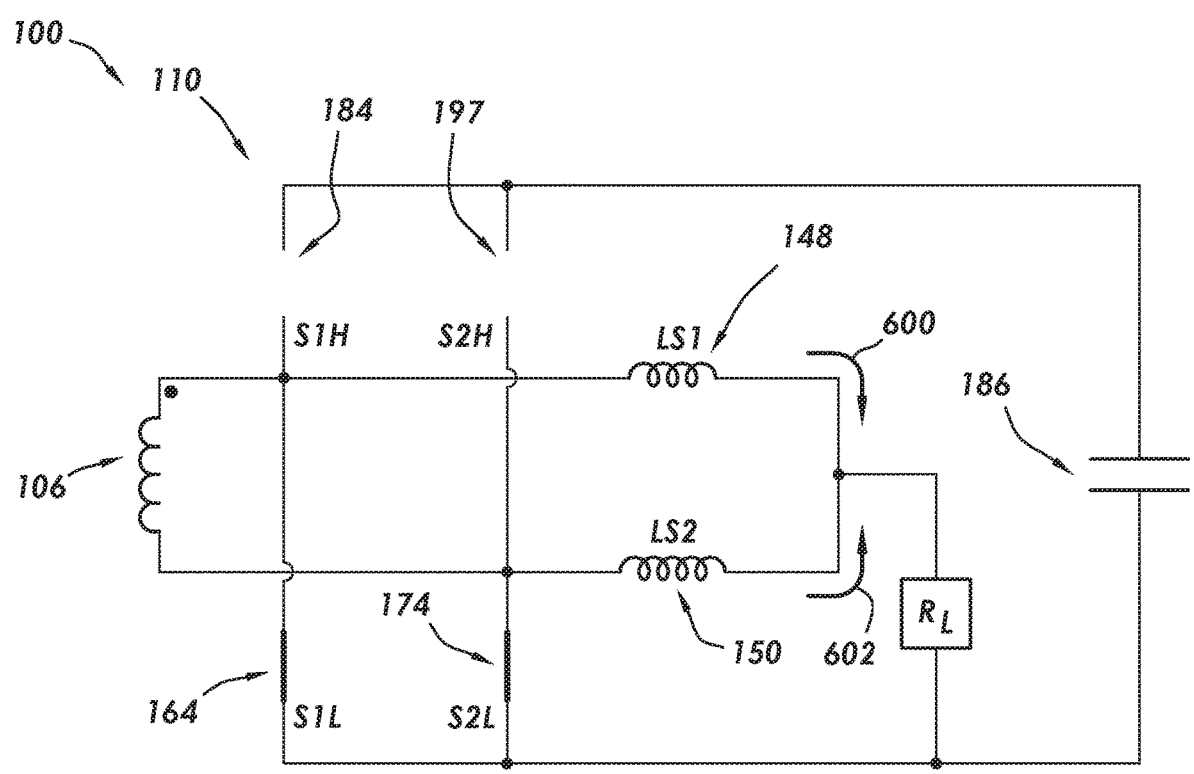
FIG. 6 shows a simplified circuit diagram of the secondary side of the current-doubler converter in accordance with at least some embodiments.

FIG. 6 shows a simplified circuit diagram of the secondary side 110 of the current-doubler converter 100 in accordance with at least some embodiments. Referring simultaneously to FIGS. 2 and 6, FIG. 6 shows an example state of the secondary side 110 during the time period t3->t4 of FIG. 2. During the example time period, no voltage is induced on the secondary winding 106. Because of the previous charging of the LS1 inductor 148 and LS2 inductor 150, both inductors supply current to the load $R_L$ based on the fields around the respective inductors collapsing, and as shown in plots 212 and 214 of FIG. 2. The current 600 provided by the LS1 inductor 148 returns to the inductor by way of the S1L FET 164. Similarly, current 602 provided by LS2 inductor 150 returns to the inductor by way of the S2L FET 174. As before, because the S1L FET 164 is conductive its companion S1H FET 184 is non-conductive, and when the S2L FET 174 is conductive its companion S2H FET 197 is non-conductive. Thus, the situation of FIG. 6 is closely related to FIG. 3, and while both the LS1 inductor 148 and the LS2 inductor 150 provide current, in the situation of FIG. 6 the LS1 inductor 148 provides more current, as the LS1 inductor 148 was most recently charged.

Figure 7:
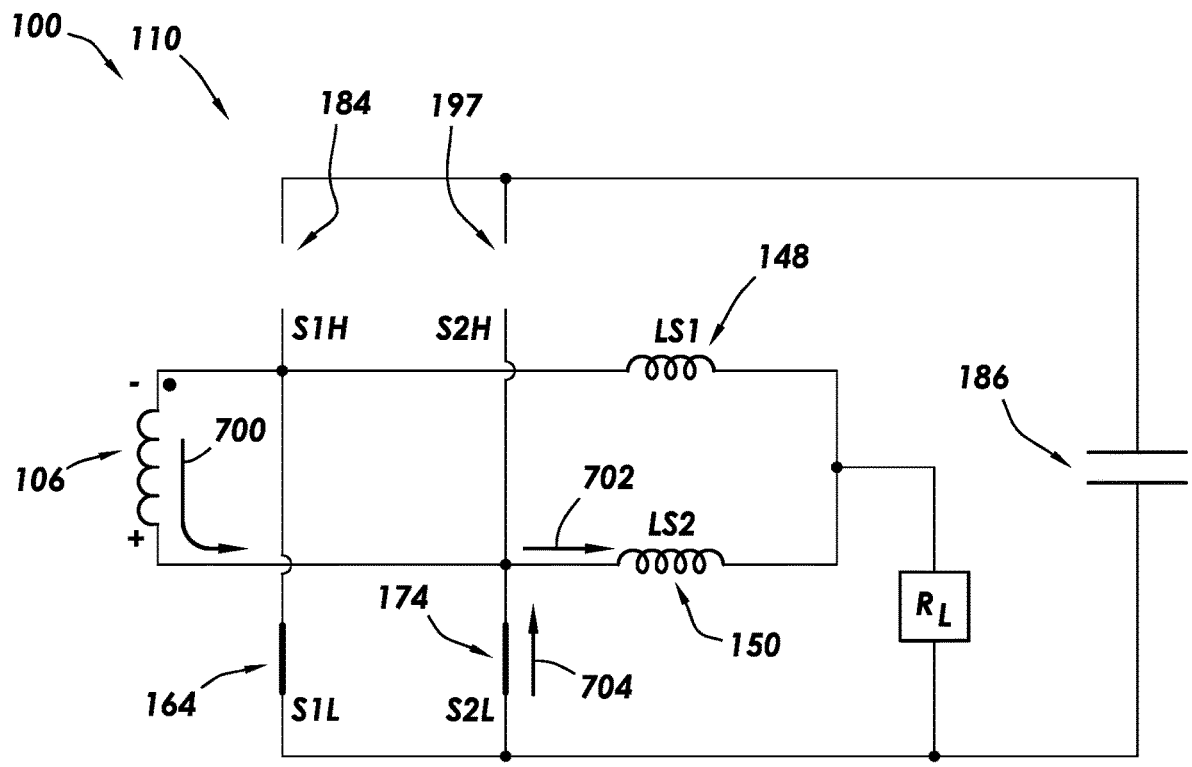
FIG. 7 shows a simplified circuit diagram of the secondary side of the current-doubler converter in accordance with at least some embodiments.

FIG. 7 shows a simplified circuit diagram of the secondary side 110 of the current-doubler converter 100 in accordance with at least some embodiments. Referring simultaneously to FIGS. 2 and 7, FIG. 7 shows an example state of the secondary side 110 during the time period t4->t5 of FIG. 2. In the example time period, the PL FET 130 (not shown) is conductive. However, again because of the inductive aspects of the primary winding 104, current flow through the secondary winding 106 ramps up over time.

The related-art issued noted above regarding power converters are also present with the respect to operation of the PL FET 130, the S2L FET 174, and the S2H FET 197. The entire explanation will not be repeated so as not to unduly lengthen specification. In summary, making the S2 FET 174 non-conductive too early results in interrupting current flow returning to the LS2 inductor 150 through the S2 FET 174. And making the S2H FET 197 conductive too early results in switching potentially significant voltage across the S2H FET 197 from the clamp capacitor 186.

Returning to FIGS. 2 and 7, the current-doubler converter 100 in accordance with example embodiments also implements a variable time delay $td_2$ between the PL FET 130 becoming conductive and the S2L FET 174 becoming non-conductive (and the S2H FET 197 becoming conductive). The variable time delay $td_2$ is the time between t4 and t5 in FIG. 2. In accordance with example cases, the configuration of FIG. 7 is maintained until the magnitude of the current 700 through the secondary winding 106 matches or is about the same as the magnitude of the current 702 through the LS2 inductor 150. When the magnitude of the current 700 through the secondary winding 106 matches or is about the same as the magnitude of the current 702 through the LS2 inductor 150, the current 704 through the S2L FET 174 is zero or close to zero. Moreover, in steady-state operation, when the magnitude of the current 700 through the secondary winding 106 matches or is about the same as the magnitude of the current 702 through the LS2 inductor 150, the voltage on the secondary winding 106 will be about the same as the voltage on the clamp capacitor 186. As will be discussed in greater detail below, in example embodiments the converter controller 126 (FIG. 1) creates a ramp signal proportional to the current 700. The converter controller 126 further senses the current 702 through the LS2 inductor 150, and the sensing creates a signal indicative of the LS2 inductor current. The converter controller 126 changes conductive state of the S2L FET 174 from conductive to non-conductive when a magnitude the ramp signal crosses the magnitude of the signal indicative of the first inductor current. The discussion continues with working through the remaining time periods of FIG. 2.

Figure 8:
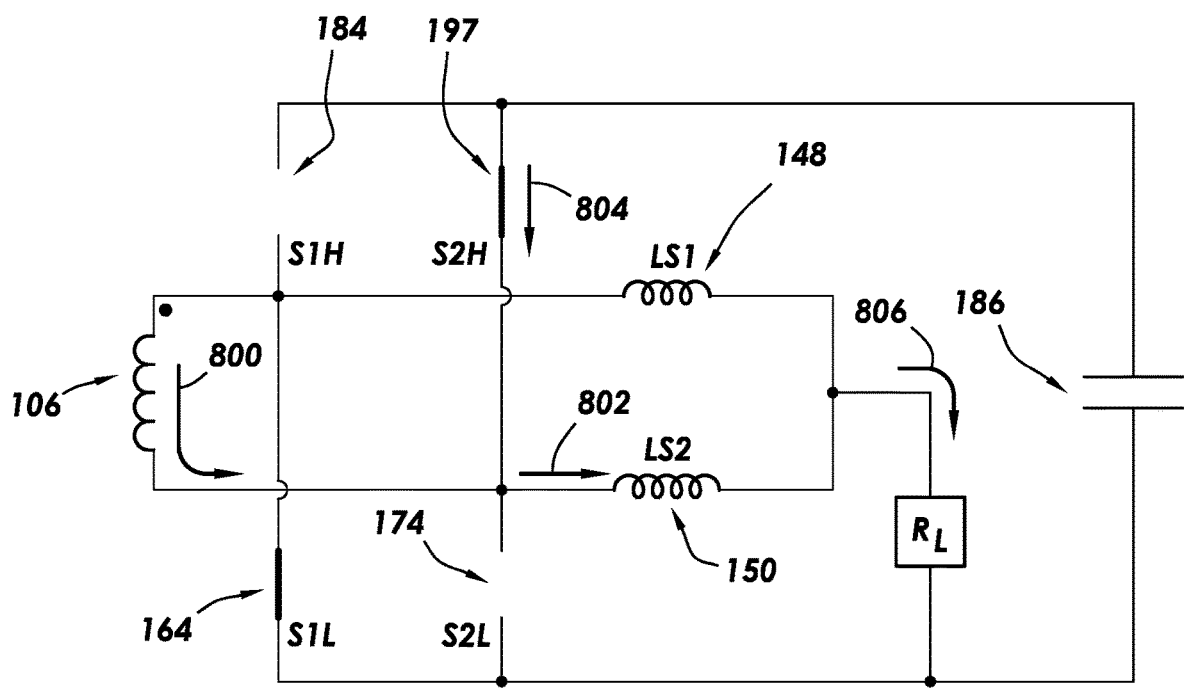
FIG. 8 shows a simplified circuit diagram of the secondary side of the current-doubler converter in accordance with at least some embodiments.

FIG. 8 shows a simplified circuit diagram of the secondary side 110 of the current-doubler converter 100 in accordance with at least some embodiments. Referring simultaneously to FIGS. 2 and 8, FIG. 8 shows an example state of the secondary side 110 during the time period t5->t6 of FIG. 2. In the example time period, the PL FET 130 is still conductive. However, the S2L FET 174 is non-conductive, the S2H FET 197 is conductive, and the S1L FET 164 remains conductive. Several actions take place in the example time period. In particular, the voltage across the secondary winding 106 (or the voltage across the clamp capacitor 186) charges or ramps up the current 802 through the LS2 inductor 150 (e.g., plot 214 of FIG. 2). Through the conduction of the S2H FET 197, the clamp capacitor 186 provides a current 804. Further, the field associated with the LS1 inductor 148 continues to collapse, and thus the LS1 inductor 148 continues to provide current to the load $R_L$ (e.g., plot 212 of FIG. 2). Thus, the current 806 provided to the load $R_L$ may comprise contributions from the both the LS2 inductor 150 (charged/boosted by the voltage across the secondary winding 106 (or the voltage across the clamp capacitor 186)) and the LS1 inductor 148. The amount of time that the example PL FET 130 remains conductive (e.g., the duty cycle of PL gate signal in plot 202) is based on the output voltage of the current-doubler converter, but nevertheless is limited to 50% duty cycle as discussed above. Thus, time t6 is controlled by the converter controller 126 based on load.

The time period t6->t7 is duplicative of the period of time period t0->t1, and thus is not separately analyzed. Similarly, time period t7->t8 is duplicative of time period t1->t2, and thus is not separately analyzed. The specification now turns to a description of an example converter controller 126.

Figure 9:
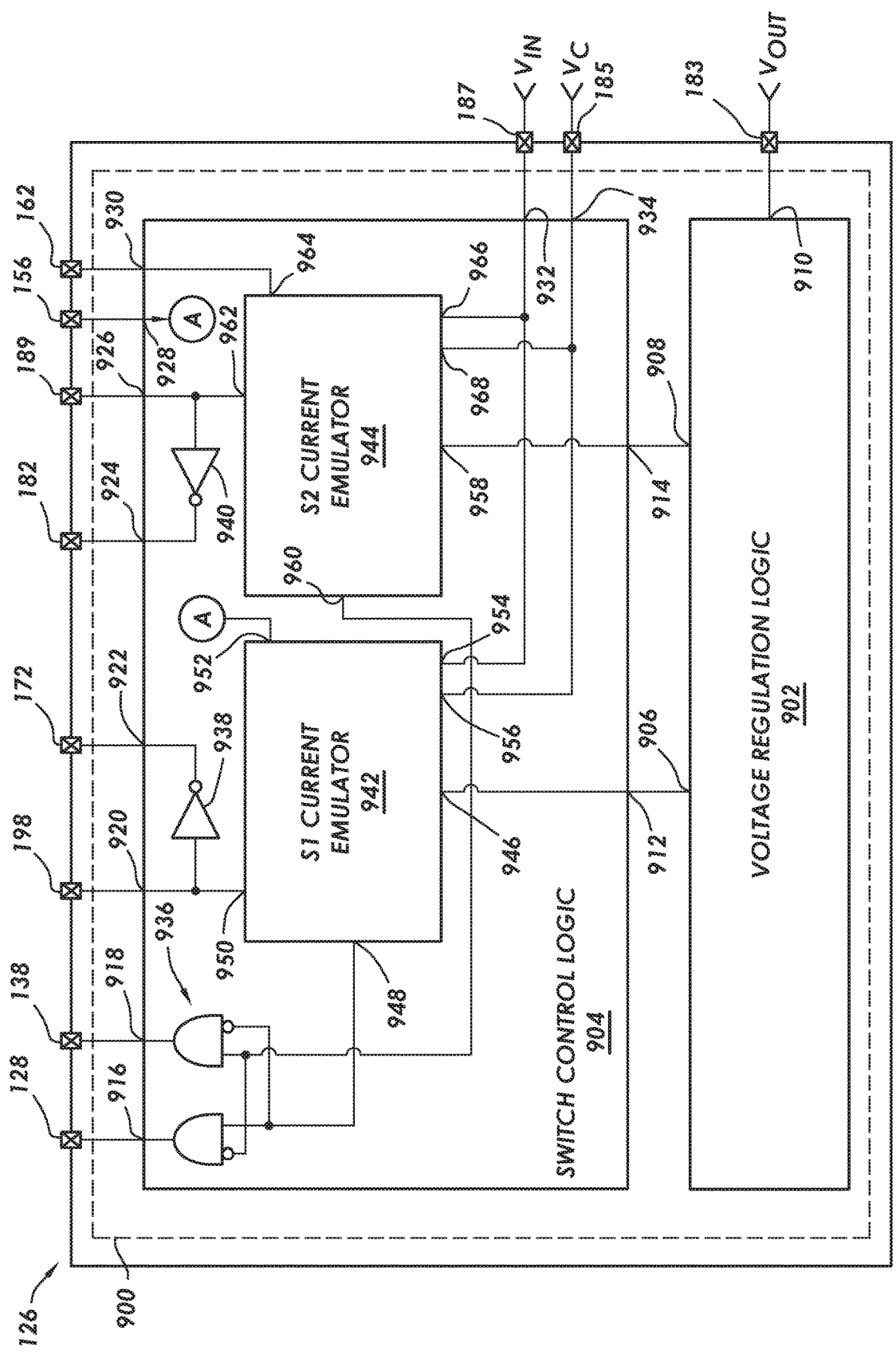
FIG. 9 shows a block diagram of a converter controller in accordance with at least some embodiments.

FIG. 9 shows a block diagram of a converter controller 126 in accordance with at least some embodiments. In particular, FIG. 9 shows the converter controller 126 as a packaged semiconductor device or packaged integrated circuit device having a plurality of externally accessible pins or terminals. Shown in FIG. 9 are the PH drive terminal 128, the PL drive terminal 138, the S1H drive terminal 198, the S1L drive terminal 172, the S2L drive terminal 182, the S2H drive terminal 189, the LS1 current sense terminal 156, the LS2 current sense terminal 162, the input voltage terminal 187, the clamp voltage terminal 185, and the feedback terminal 183. Additional terminals would be present (e.g., ground or common, voltage supply, various terminal to connect to external resistances and capacitances), but such additional terminals are not shown so as to not further complicate the figure. Within the packaged device resides a semiconductor die 900 upon which the various electrical circuits are monolithically constructed. While FIG. 9 shows only a single semiconductor die 900, two or more semiconductor dies may be packaged together (i.e., a multi-chip module) to create the converter controller 126.

The example converter controller includes a voltage regulation logic 902 and a switch control logic 904. The voltage regulation logic 902 defines a first pulse-width modulation output (PWM1 output 906), a second pulse-width modulation output (PWM2 output 908), and a feedback input 910 coupled to the feedback terminal 183. The voltage regulation logic 902 is configured to drive a PWM1 signal of variable duty cycle to the PWM1 output 906, and is configured to drive a PWM2 signal of variable duty cycle to the PWM2 output 908, all based on a signal indicative of output voltage received on the feedback terminal 183. In some cases, the voltage regulation logic 902 limits the duty cycle of the PWM1 signal and the PWM2 signal to 50% in steady-state operation.

Still referring to FIG. 9, the example switch control logic 904 defines a PWM1 input 912 coupled to the PWM1 output 906, and a PWM2 input 914 coupled to the PWM2 output 908. Working across the top of the switch control logic 904 from left to right, the example switch control logic 904 defines PH drive output 916, a PL drive output 918, an S1H drive output 920, an S1L drive output 922, an S2L drive output 924, an S2H drive output 926, an LS1 current sense input 928, and LS2 current sense input 930, a source input 932, and a clamp voltage input 934. The PH drive output 916 is coupled to the PH drive terminal 128. The PL drive output 918 is coupled to the PL drive terminal 138. The S1H drive output 920 is coupled to the S1H drive terminal 198. The S1L drive output 922 is coupled to the S1L drive terminal 172. The S2L drive output 924 is coupled to the S2L drive terminal 182. The S2H drive output 926 is coupled to the S2H drive terminal 189. The LS1 current sense input 928 is coupled to the LS1 current sense terminal 156. The LS2 current sense input 930 is coupled to the LS2 current sense terminal 162. The source input 932 is coupled to the input voltage terminal 187. And the clamp voltage input 934 is coupled to the clamp voltage terminal 185.

In accordance with example embodiments, the switch control logic 904 is designed and constructed to assert the PH drive terminal 128 responsive to assertion of the PWM1 input 912, though in certain conditions discussed more below (e.g., primary side overcurrent), the switch control logic 904 may refrain from asserting the PH drive terminal 128 in spite of assertion of the PWM1 input 912. Moreover, the example switch control logic 904 is designed and constructed to assert the PL drive terminal 138 responsive to assertion of the PWM2 input 914, though again in certain conditions discussed more below the switch control logic 904 may refrain from asserting the PL drive terminal 138 in spite of assertion of the PWM2 input 914.

The example switch control logic 904 is further designed and constructed to assert the S1H drive terminal 198 and de-assert the S1L drive terminal 172 at a first time delay after assertion of the PWM1 input 912. The first time delay is variable and based on a signal indicative of input voltage applied to the input voltage terminal 187. In particular, the first time delay is based on the voltage on the input voltage terminal 187 and the current sensed through the LS1 current sense terminal 156. More particularly still, the switch control logic 904 is configured to change the state of the S1H drive terminal 198 and the S1L drive terminal 172 when a signal indicative of current sensed by way of the LS1 current sense terminal 156 and a ramp signal indicative of current in the secondary winding show the currents are within a predetermined threshold of each other. The example switch control logic 904 is further designed and constructed to de-assert the S1H drive terminal 198 and assert the S1L drive terminal 172 based on de-assertion of the PWM1 input 912.

The example switch control logic 904 is further designed and constructed to assert the S2H drive terminal 189 and de-assert the S1L drive terminal 182 at a second time delay after assertion of the PWM2 input 914. The second time delay is variable and based on the signal indicative of input voltage applied to the input voltage terminal 187. In particular, the second time delay is based on the voltage on the input voltage terminal 187 and the current sensed through the LS2 current sense terminal 162. More particularly still, the switch control logic 904 is configured to change the state of the S2H drive terminal 189 and the S2L drive terminal 182 when a signal indicative of current sensed by way of the LS2 current sense terminal 162 and a ramp signal indicative of current in the secondary winding show the currents are within a predetermined threshold of each other. The example switch control logic 904 is further designed and constructed to de-assert the S2H drive terminal 189 and assert the S2L drive terminal 182 based on de-assertion of the PWM2 input 914.

The example switch control logic 904 can be implemented in any suitable form. FIG. 9, shows an example implementation of the switch control logic 904 that comprises a cross-coupled AND gate logic 936 for drive terminals, a logic NOT gate 938, a logic NOT gate 940, an S1 current emulator 942, and an S2 current emulator 944. The example S1 current emulator 942 defines a PWM1 input 946, a PH drive output 948, a S1 drive output 950, an LS1 current sense input 952, a source input 954, and a clamp voltage input 956. The PWM1 input 946 is coupled to the PWM1 output 906 of the voltage regulation logic 902. The PH drive output 948 is coupled to a first logic AND gate of the cross-coupled AND gate logic 936. The S1 drive output 950 is coupled to the S1H drive terminal 198 as well as an input of the logic NOT gate 938. The LS1 current sense input 952 is coupled to the LS1 current sense terminal 156. The source input 954 is coupled to the input voltage terminal 187. And the clamp voltage input 956 is coupled to the clamp voltage terminal 185. The output of the logic NOT gate 938 is coupled to the S1L drive terminal 172 to implement the functionality of the S1H FET 184 being conductive alternately with its companion S1L FET 164.

The example S2 current emulator 942 defines a PWM2 input 958, a PL drive output 960, a S2 drive output 962, an LS2 current sense input 964, a source input 966, and a clamp voltage input 968. The PWM2 input 958 is coupled to the PWM2 output 908 of the voltage regulation logic 902. The PL drive output 960 is coupled to a second logic AND gate of the cross-coupled AND gate logic 936. The S2 drive output 962 is coupled to the S2H drive terminal 189 as well as an input of the logic NOT gate 940. The LS2 current sense input 964 is coupled to the LS2 current sense terminal 162. The source input 966 is coupled to the input voltage terminal 187. And the clamp voltage input 968 is coupled to the clamp voltage terminal 185. The output of the logic NOT gate 940 is coupled to the S2L drive terminal 182 to implement the functionality of the S2H FET 197 being conductive alternately with its companion S2L FET 174.

The example S1 current emulator 942 is designed and constructed to control the first time delay between assertion of the PWM1 signal, and as a group making the S1H FET 184 conductive and the S1L FET 164 non-conductive (e.g., first time delay $td_1$ of FIG. 2). As mentioned above, the example S1 current emulator 942 makes the decision regarding the first time delay $td_1$ by, in each asserted cycle of the PWM1 signal, creating a ramp signal that emulates or is indicative of the current the primary winding. Inasmuch as the current in the primary winding is directly related to the current in the secondary winding taking into account the turns ratio, it is equally valid to say the ramp signal emulates or is indicative of the current in the secondary winding. When the ramp signal indicates that current in the secondary winding is within a predetermined threshold of current through the LS1 inductor 148 (FIG. 1), the various S1 FETs change state and thereby implement one or both of reduced current switching or reduced voltage switching.

Similarly, the example S2 current emulator 944 is designed and constructed to control the second time delay between assertion of the PWM2 signal, and as a group making the S2H FET 197 conductive and the S2L FET 174 non-conductive (e.g., second time delay $td_2$ of FIG. 2). As before, the example S2 current emulator 944 makes the decision regarding the second time delay $td_2$ by, in each asserted cycle of the PWM2 signal, creating a ramp signal that emulates or is indicative of the current the secondary winding. When the ramp signal indicates that current in the secondary winding is within a predetermined threshold of current through the LS2 inductor 150 (FIG. 1), the various S2 FETs change state and thereby implement one or both of reduced current switching or reduced voltage switching.

The S1 current emulator 942 and the S2 current emulator 944 operate in the same fashion, just with respect to assertion of different PWM signals (i.e., the PWM1 for the S1 current emulator 942, and PWM2 for the S2 current emulator 944) and different inductor current sense signals. The specification now turns to a more detailed discussion of the S1 current emulator 942 with the understanding that the S2 current emulator 944 has duplicate components and operates similarly, just with respect the S2 components.

Figure 10:
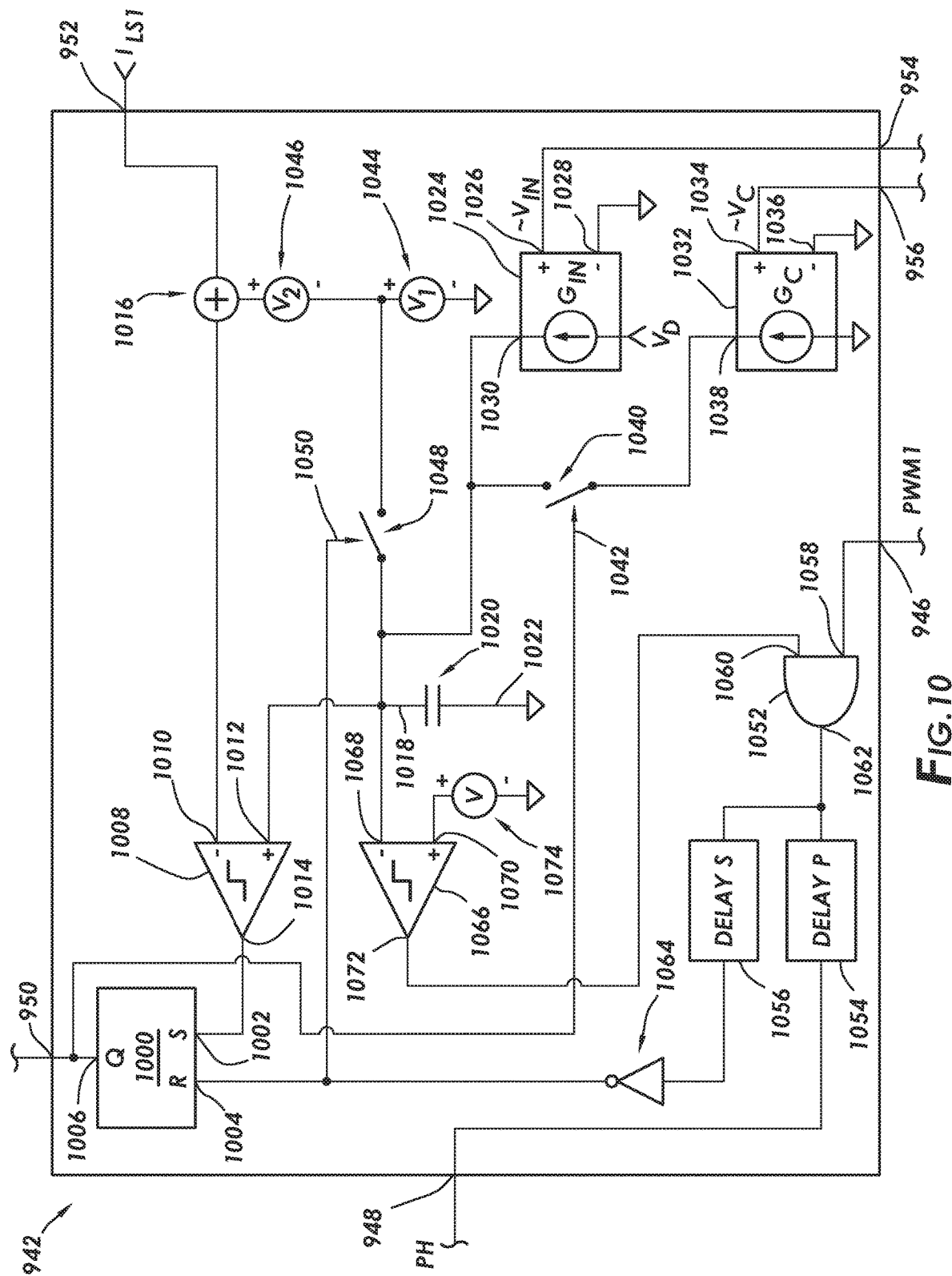
FIG. 10 shows a current emulator in accordance with example embodiments.

FIG. 10 shows an S1 current emulator 942 in accordance with example embodiments. In particular, the example S1 current emulator 942 comprises a latch 1000 in the example form of a set-reset flip-flop. The latch 1000 thus defines a set input 1002, a reset input 1004, and an output 1006. The output 1006 is coupled to the S1 drive output 950 and thus the S1H drive terminal 198 (FIG. 9). The example S1 current emulator 942 further comprises a ramp comparator 1008 that defines an inverting input 1010, a non-inverting input 1012, and a comparator output 1014. The inverting input 1010 is coupled to the LS1 current sense input 952 by way of a summation block 1016. The non-inverting input 1012 is coupled to the first lead 1018 of the a ramp capacitor 1020, and a second lead 1022 of the ramp capacitor 1020 is coupled to common or ground within the converter controller 126. The comparator output 1014 is coupled to the set input 1002 of the latch 1000.

The example S1 emulator 942 further comprises a first transconductance amplifier 1024. The first transconductance amplifier 1024 defines a first sense input 1026, a second sense input 1028 and a current output 1030. The first sense input 1026 is coupled to the source input 954, and thus receives a signal indicative of input voltage. The second sense input 1028 is coupled to common or ground. The current output 1030 is coupled to the first lead 1018 of the ramp capacitor 1020. As shown, the first transconductance amplifier 1024 is arranged to drive a current to the ramp capacitor 1020, where the current driven is proportional to the input voltage $V_{IN}$. Controlling the proportionality may take any suitable form, such as controlling the voltage scaling of the input voltage $V_{IN}$ applied to the source input 954, controlling the gain GIN of the first transconductance amplifier 1024, or both.

The example S1 emulator 942 further comprises a second transconductance amplifier 1032. The second transconductance amplifier 1032 defines a first sense input 1034, a second sense input 1036, and a current output 1038. The first sense input 1034 is coupled to the clamp voltage input 956, and thus receives a signal indicative of the voltage on the clamp capacitor 186 (FIG. 1). The second sense input 1036 is coupled to common or ground. The current output 1038 is coupled to the first lead 1018 of the ramp capacitor 1020 by way of an electrically controlled switch 1040, hereafter just switch 1040. Switch 1040 defines a control input 1042, and the control input 1042 is coupled to the output 1006 of the latch 1000. In the example embodiment, switch 1040 is conductive when the S1 drive output 950 is conductive (i.e., when the S1H FET 184 is conductive and when the S1L FET is non-conductive). As shown, the second transconductance amplifier 1032 is arranged to drive away from the ramp capacitor 1020, where the current driven is proportional to the voltage on the clamp capacitor 186. Controlling the proportionality may take any suitable form, such as controlling the voltage scaling of the voltage from the clamp capacitor 186 applied to the clamp voltage input 956, controlling the gain GC of the second transconductance amplifier 1032, or both. The second transconductance amplifier 1032 plays a role in addressing overcurrent of the primary side 108 of the power converter, and is discussed in greater detail after a discussion of implementation of the variable time delay $td_1$.

Still referring to FIG. 10, the example S1 current emulator 942 further comprises voltage source V1 1044, a voltage source V2 1046, and an electrically controlled switch 1048 (hereafter just switch 1048). The voltage source V1 1044 is coupled to the first lead 1018 of the ramp capacitor 1020 by way of the switch 1048. Switch 1048 defines a control input 1050 coupled to the reset input 1004 of the latch 1000. In accordance with example embodiments, the switch 1048 is conductive during periods of time when the reset input 1004 is asserted. The voltage source V1 1044 thus resets the voltage on the ramp capacitor 1020 in each de-asserted cycle of the PWM1 signal, and provides a bias voltage to the ramp capacitor 1020 to boost the ramp signal created on the ramp capacitor 1020 into a more sensitive range of the ramp comparator 1008. Similarly, voltage source V1 1044 provides a bias voltage to the signal indicative of the LS1 inductor current. A relative small voltage or zero voltage source V2 is added to the signal indicative of the LS1 inductor current to provide an offset or margin for zero-current or zero voltage switching.

The example S1 current emulator 942 further comprises a logic AND gate 1052, a delay P circuit 1054, and a delay S circuit 1056. The logic AND gate 1052 defines a first input 1058, a second input 1060, and gate output 1062. The first input 1058 is coupled to the PWM1 input 946, and the gate output 1062 is coupled to the delay P circuit 1054. The delay P circuit 1054 is coupled to the PH drive output 948. The delay P circuit 1054 represents a small delay added to the gate signal of the PH FET 118 if the primary driver has less propagation delay than the secondary driver. Moreover, the delay P circuit 1054 may be used to account for other timing issues, such as process delays associated with variances in semiconductor processing. In some cases, the delay represented by the delay P circuit 1054 may be programmable (e.g., external resistors, serial peripheral interconnect (SPI) bus programming). The delay S circuit 1056 is coupled between the gate output 1062 and a logic NOT gate 1064. The logic NOT gate 1064 is coupled to the reset input 1005 of the latch 1000. The delay S circuit 1056 represents a small delay added to the gate signals of the S1 FETs if the secondary driver has less propagation delay than the primary driver. Moreover, the delay S circuit 1056 may be used to account for other timing issues, such as process delays associated with variances in semiconductor processing. In some cases the delay represented by the delay S circuit 1056 may be programmable.

Still referring to FIG. 10, the example S1 current emulator 942 further comprises an overcurrent comparator 1066 that defines an inverting input 1068, a non-inverting input 1070, and a overcurrent output 1072. The inverting input 1068 is coupled to the first lead 1018 of the ramp capacitor 1020. The non-inverting input 1070 is coupled a voltage source 1074. The overcurrent output 1072 is coupled to the second input 1060 of the logic AND gate 1052. As will be discussed in greater below, the overcurrent comparator 1066 is used to detect overcurrent on the primary side 108 of the current-doubler converter 100, and thus the voltage source 1074 is a predetermined voltage that indicates an overcurrent condition.

Referring simultaneously to FIGS. 2 and 10, consider first the time period t0->t1. During the example time period, the switch 1048 is conductive, thus resetting and applying the bias voltage to the ramp capacitor 1020. Moreover, switch 1040 is non-conductive because the output 1006 of the latch 1000 is de-asserted.

Now consider time t1. At time t1, the PWM1 signal goes asserted, and after a delay associated with the delay P circuit 1054, the PH drive output 948 is asserted and thus the PH gate signal is asserted (e.g., plot 200). Simultaneously, the reset signal applied the reset input 1004 of the latch 1000 is de-asserted, but the set input 1002 has not yet been asserted. The switch 1048 becomes non-conductive responsive to de-assertion of the reset signal, and the first transconductance amplifier 1024 drives a current to the ramp capacitor 1020. The current driven to the ramp capacitor 1020 creates a voltage that is a ramp signal (e.g., the solid line in plot 216), and where the current driven is proportional to the voltage on the source input 954. Thus, the voltage on the ramp capacitor 1020 is an emulation of the current in the secondary winding 106.

During the example time period t1->t2, the ramp comparator 1008 compares the signal indicative of current through the LS1 inductor (applied to the LS1 current sense input 952) to the ramp signal of the ramp capacitor 1020 (indicative of current through the secondary winding 106). Now consider time t2. At time t2, a magnitude of the ramp signal transitions through a magnitude of the signal indicative of current through the LS1 inductor applied to the LS1 current sense input 952. When the transition occurs, the ramp comparator 1008 asserts the comparator output 1014, which asserts the set input 1002 of the latch 1000, and thus changes the conductive state of the S1 FETs (e.g., makes the S1H FET 184 conductive, and makes the S1L FET 164 non-conductive). The assertion of the set input 1002 asserts the output 1006 of the latch, and thus the switch 1040 also becomes conductive. During the time period t2->t3, the first transconductance amplifier 1024 continues to drive current to the ramp capacitor 1020 proportional to the input voltage $V_{IN}$, and the second transconductance amplifier 1032 pulls current away from the ramp capacitor proportional to the voltage on the clamp capacitor 186.

Returning briefly to FIG. 1. In the example current-doubler converter 100 shown, the LS1 current sensor 152 measures current through the LS1 inductor 148. Likewise, the LS2 current sensor 158 measures current through the LS2 inductor 150. However, in the example circuit the current on the primary side 108 (e.g., the current through the primary winding 104) is not measured. In steady-state and non-fault operation, overcurrent protection can be implemented using the current measurements from just the LS1 current sensor 152 and the LS2 current sensor 158. However, there are some overcurrent conditions the LS1 current sensor 152 and the LS2 current sensor 158 do not see. For example, at startup when the clamp capacitor 186 is fully discharged, the first few cycles of the bridge circuit 116 may reach an overcurrent limit as the in-rush current builds charge on the clamp capacitor 186. As another example, an unexpected overvoltage condition at the input voltage $V_{IN}$ may likewise cause overcurrent conditions on the primary side 108, but those overcurrent conditions will not be immediately sensed by the current sensors 152 and 158. However, in accordance with at least some embodiments, the ramp signal created on the ramp capacitor of the current emulators can be used to implement overcurrent protection.

Returning to FIG. 10, the example overcurrent comparator 1066 is used to detect overcurrent conditions. In particular, at times when the PWM1 signal is asserted (e.g., time t1->t2 of FIG. 2), the overcurrent comparator 1066 compares the ramp signal on the ramp capacitor 1020 to the predetermined threshold set by voltage source 1074. When the magnitude of the ramp signal applied to the inverting input 1068 of the overcurrent comparator 1066 transitions through the predetermined voltage applied by the voltage source 1074 to the non-inverting input 1070, the overcurrent comparator 1066 asserts the overcurrent output 1072 (in the example, asserted low). Because the overcurrent output 1072 is coupled to the logic AND gate 1052, the assertion cuts off the PWM1 signal, thus ultimately making the PH FET 118 non-conductive.

Referring simultaneously to FIGS. 2 and 10 again, in non-fault operation with the clamp capacitor 186 charged, making the S1H FET 184 conductive reduces the current flow from the secondary winding 106, as the clamp capacitor 186 pumps charge through the LS1 inductor 148. The ramp signal on the ramp capacitor 1020 emulates the current flow, because the second transconductance amplifier 1032 pulls current away from the ramp capacitor 1020 proportional to the voltage on the clamp capacitor 186 (e.g., time t2->t3, solid line in plot 216). However, if one considers that the voltage on the clamp capacitor 186 is zero (e.g., at startup), current flow through the secondary winding will continue to ramp up after the S1H FET becomes conductive because the secondary winding will be both charging the clamp capacitor and charging the LS1 inductor, and primary current may well reach an overcurrent condition before the de-assertion of the PWM1 signal by the voltage regulation logic 902. On the emulation side, the ramp signal will not be reduced by the second transconductance amplifier 1032 in the stated conduction, and thus the ramp signal may be used to detect the overcurrent condition.

As stated above, the S2 current emulator 944 has a similar circuit and works similarly to the S1 current emulator 942. The S2 current emulator 944 would be active during assertions of the PWM2 signal (e.g., time t4->t6), and operates PL FET 130 and the S2 family of FETS (i.e., S2H FET 197 and S2L FET 174), but the operating principles are the same.

Figure 11:
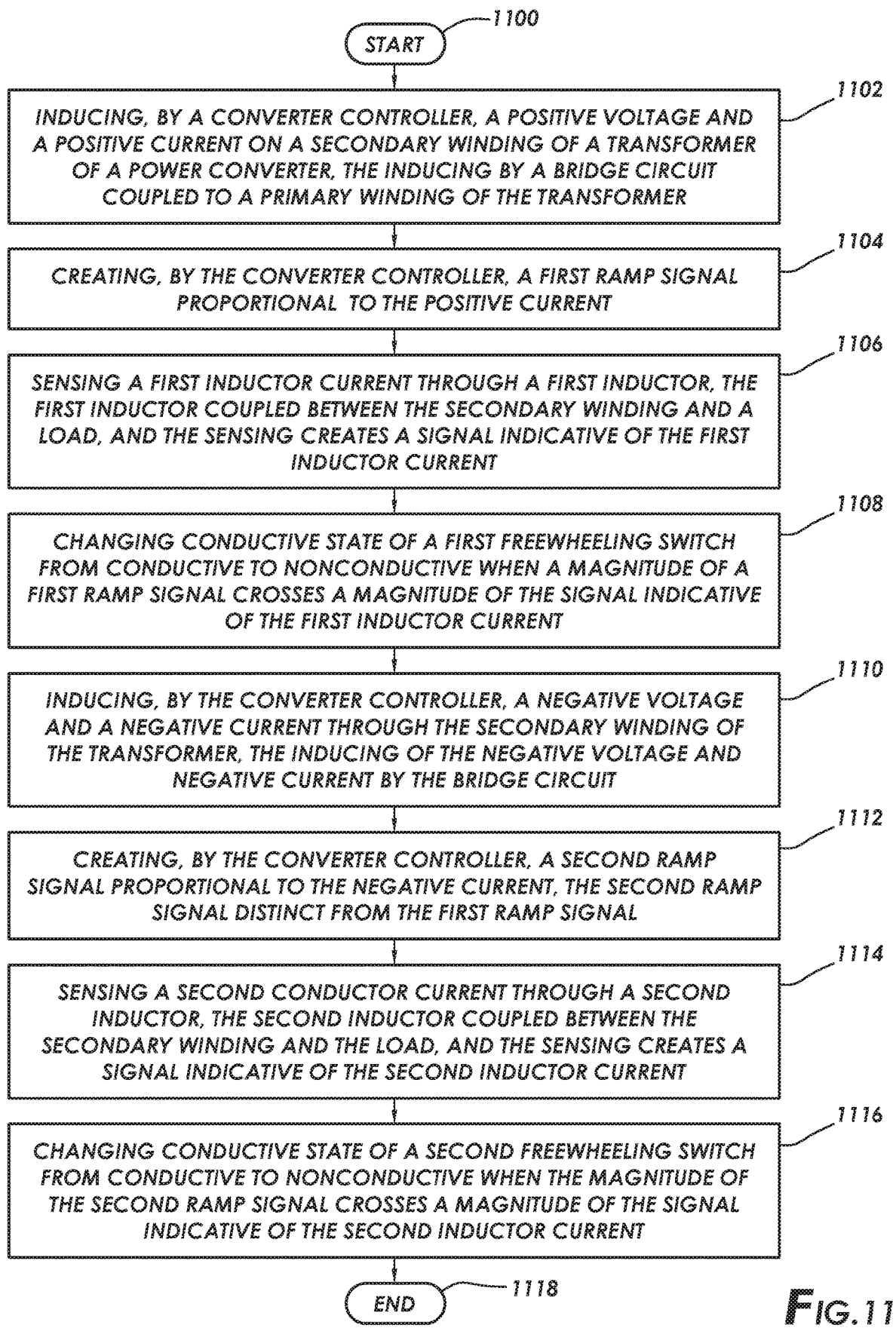
FIG. 11 shows a method in accordance with at least some embodiments.

FIG. 11 shows a method in accordance with at least some embodiments. In particular, the method starts (block 1100) and comprises: inducing, by a converter controller, a positive voltage and a positive current on a secondary winding of a transformer of a power converter, the inducing by a bridge circuit coupled to a primary winding of the transformer (block 1102); creating, by the converter controller, a first ramp signal proportional to the positive current (block 1104); sensing a first inductor current through a first inductor, the first inductor coupled between the secondary winding and a load, and the sensing creates a signal indicative of the first inductor current (block 1106); changing conductive state of a first freewheeling switch from conductive to non-conductive when a magnitude of a first ramp signal crosses a magnitude of the signal indicative of the first inductor current (block 1108); inducing, by the converter controller, a negative voltage and a negative current through the secondary winding of the transformer, the inducing of the negative voltage and negative current by the bridge circuit (block 1110); creating, by the converter controller, a second ramp signal proportional to the negative current, the second ramp signal distinct from the first ramp signal (block 1112); sensing a second inductor current through a second inductor, the second inductor coupled between the secondary winding and the load, and the sensing creates a signal indicative of the second inductor current (block 1114); and changing conductive state of a second freewheeling switch from conductive to non-conductive when the magnitude of the second ramp signal crosses a magnitude of the signal indicative of the second inductor current (block 1116). Thereafter the method ends (block 1118).

Many of the electrical connections in the drawings are shown as direct couplings having no intervening devices, but not expressly stated as such in the description above. Nevertheless, this paragraph shall serve as antecedent basis in the claims for referencing any electrical connection as "directly coupled" for electrical connections shown in the drawing with no intervening device(s).

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method of operating a power converter, the method comprising:
    inducing, by a converter controller, a positive voltage and a positive current on a secondary winding of a transformer of a power converter, the inducing by a bridge circuit coupled to a primary winding of the transformer;
    creating, by the converter controller, a first ramp signal proportional to the positive current;
    sensing a first inductor current through a first inductor, the first inductor coupled between the secondary winding and a load, and the sensing creates a signal indicative of the first inductor current; and
    changing conductive state of a first freewheeling switch from conductive to non-conductive when a magnitude of the first ramp signal crosses a magnitude of the signal indicative of the first inductor current.

2. The method of claim 1:
    wherein creating the first ramp signal further comprises driving current through a first amplifier to a ramp capacitor, the driving proportional to an input voltage of the power converter;
    wherein changing conductive state of the first freewheeling switch further comprises asserting an output of a ramp comparator when the magnitude of the first ramp signal applied a first input of the ramp comparator transitions through the magnitude of the signal indicative of the first inductor current applied to a second input of the ramp comparator.

3. The method of claim 2 wherein, after changing conductive state of the first freewheeling switch, creating the first ramp signal further comprises driving current through a second amplifier from the ramp capacitor, the driving proportional to a voltage on a clamp capacitor.

4. The method of claim 3 further comprising limiting electrical current applied to the primary winding by asserting an output of an overcurrent comparator when the magnitude of the first ramp signal applied to a first input of the overcurrent comparator transitions through a predetermined voltage applied to a second input of the overcurrent comparator.

5. The method of claim 1 further comprising
    inducing, by the converter controller, a negative voltage and a negative current through the secondary winding of the transformer, the inducing of the negative voltage and the negative current by the bridge circuit;
    creating, by the converter controller, a second ramp signal proportional to the negative current, the second ramp signal distinct from the first ramp signal;
    sensing a second inductor current through a second inductor, the second inductor coupled between the secondary winding and the load, and the sensing creates a signal indicative of the second inductor current; and
    changing conductive state of a second freewheeling switch from conductive to non-conductive when the magnitude of the second ramp signal crosses a magnitude of the signal indicative of the second inductor current.

6. The method of claim 5 wherein inducing the negative voltage further comprises inducing the negative voltage by the bridge circuit being a half-bridge circuit.

7. The method of claim 5:
    wherein creating the first ramp signal further comprises driving current through a first amplifier to a first ramp capacitor, the driving proportional to an input voltage of the power converter;
    wherein creating the second ramp signal further comprises driving current through a second amplifier to a second ramp capacitor, the driving current through the second amplifier proportional to the input voltage of the power converter;
    wherein changing conductive state of the first freewheeling switch further comprises asserting an output of a first ramp comparator when the first ramp signal applied a first input of the first ramp comparator transitions through the signal indicative of the first inductor current applied to a second input of the first ramp comparator;

wherein changing conductive state of the second freewheeling switch further comprises asserting an output of a second ramp comparator when the second ramp signal applied a first input of the second ramp comparator transitions through a signal indicative of the second inductor current applied to a second input of the second ramp comparator.

8. The method of claim 7:

wherein, after changing conductive state of the first freewheeling switch, creating the first ramp signal further comprises driving current through a third amplifier from the first ramp capacitor, the driving proportional to voltage on a clamp capacitor;

wherein, after changing conductive state of the second freewheeling switch, creating the second ramp signal further comprises driving current through a fourth amplifier from the second ramp capacitor, the driving proportional to voltage on the clamp capacitor.

9. The method of claim 8 further comprising limiting electrical current applied to the primary winding by asserting an output of a first overcurrent comparator when the first ramp signal applied to a first input of the first overcurrent comparator transitions through a predetermined voltage applied to a second input of the first overcurrent comparator.

10. The method of claim 8 further comprising limiting electrical current applied to the primary winding by asserting an output of a second overcurrent comparator when the second ramp signal applied to a first input of the second overcurrent comparator transitions through the predetermined voltage applied to a second input of the second overcurrent comparator.

11. The method of claim 1 wherein inducing the positive voltage further comprises inducing the positive voltage by the bridge circuit being a half-bridge circuit.

12. A controller for a power converter, the controller comprising:

an input voltage terminal, a first freewheeling-drive terminal, a second freewheeling-drive terminal, a first clamp drive terminal, and a second clamp drive terminal;

a voltage regulation logic defining a first pulse-width modulation output (PWM1 output) and a second pulse-width modulation output (PWM2 output);

a switch control logic defining a PWM1 input, a PWM2 input, an input voltage input coupled to the input voltage terminal;

the voltage regulation logic is configured to drive a PWM1 signal of variable duty cycle to the PWM1 output, and is configured to drive a PWM2 signal of variable duty cycle to the PWM2 output;

the switch control logic is configured to:
assert the first clamp drive terminal and de-assert the first freewheeling-drive terminal at a first time delay after assertion of the PWM1 input, the first time delay is variable and based on a signal indicative of input voltage applied to the input voltage terminal;
de-assert the first clamp drive terminal and assert the first freewheeling-drive terminal based on de-assertion of the PWM1 input;
assert the second clamp drive terminal and de-assert the second freewheeling-drive terminal at a second time delay after assertion of the PWM2 input, the second time delay is variable and based on the signal indicative of input voltage applied to the input voltage terminal; and
de-assert the second clamp drive terminal and assert the second freewheeling-drive terminal based on de-assertion of the PWM2 input.

13. The controller of claim 12 further comprising a first current-sense terminal, and wherein the switch control logic further comprises:

a first amplifier that defines a first input and a first amplifier output, the first input coupled to the input voltage terminal;

a first ramp capacitor coupled to the first amplifier output;

a ramp comparator defining a first input, a second input, and ramp output, the first input of the ramp comparator coupled to the first ramp capacitor, and the second input of the ramp comparator coupled to the first current-sense terminal;

wherein when the switch control logic asserts the first clamp drive terminal and de-asserts the first freewheeling-drive terminal at the first time delay, the switch control logic is further configured to:
drive a first current to the first ramp capacitor by way of the first amplifier, the first current proportional to a voltage on the input voltage terminal, and the driving creates a first ramp signal; and
assert the first clamp drive terminal and de-assert the first freewheeling-drive terminal by the ramp comparator when a magnitude of the first ramp signal transitions through a magnitude of a signal indicative of first inductor current on the first current-sense terminal.

14. The controller of claim 13 further comprising a primary-high drive terminal and a clamp voltage terminal, and wherein the switch control logic further comprises:

a second amplifier that defines a first input coupled to the clamp voltage terminal, and a second amplifier output coupled to the first ramp capacitor;

an overcurrent comparator having a first input coupled to the first ramp capacitor, a second input coupled to a predetermined voltage, and an overcurrent output;

wherein, after asserting the first clamp drive terminal and de-asserting the first freewheeling-drive terminal, the switch control logic is further configured to:
drive current through the second amplifier from the first ramp capacitor, the driving proportional to voltage on the clamp voltage terminal; and
de-assert the primary-high drive terminal by the overcurrent comparator if the magnitude of the first ramp signal transitions through the predetermined voltage.

15. The controller of claim 12 further comprising a first current-sense terminal and a second current-sense terminal, and wherein the switch control logic further comprises:

a first amplifier that defines a first input and a first amplifier output, the first input coupled to the input voltage terminal;

a first ramp capacitor coupled to the first amplifier output;

a first ramp comparator defining a first input, a second input, and a first ramp output, the first input of the first ramp comparator coupled to the first ramp capacitor, and the second input of the first ramp comparator coupled to the first current-sense terminal;

a second amplifier that defines a first input and a second amplifier output, the first input of the second amplifier coupled to the input voltage terminal;

a second ramp capacitor coupled to the second amplifier output;

a second ramp comparator defining a first input, a second input, and a second comparator output, the first input of the second ramp comparator coupled to the second ramp capacitor, and the second input of the second ramp comparator coupled to the second current-sense terminal;

wherein when the switch control logic asserts the first clamp drive terminal and de-asserts the first freewheeling-drive terminal at the first time delay, the switch control logic is further configured to:

drive a first current to the first ramp capacitor by way of the first amplifier, the first current proportional to a voltage on the input voltage terminal, the driving creates a first ramp signal; and assert, by the first ramp comparator, the first clamp drive terminal and de-assert the first freewheeling-drive terminal when a magnitude of the first ramp signal transitions through a magnitude of a signal indicative of a first inductor current on the first current-sense terminal;

wherein when the switch control logic asserts the second clamp drive terminal and de-asserts the second freewheeling-drive terminal at the second time delay, the switch control logic is further configured to:

drive a second current to the second ramp capacitor by way of the second amplifier, the second current proportional to the voltage on the input voltage terminal, the driving creates a second ramp signal; and assert, by the second ramp comparator, the second clamp drive terminal and de-assert the second freewheeling-drive terminal when a magnitude of the second ramp signal transitions through a magnitude of a signal indicative of a second inductor current on the second current-sense terminal.

16. A power converter comprising:

a primary side comprising:
   a primary winding of a transformer; and
   a bridge circuit defining a primary high-drive input and a primary low-drive input, the bridge circuit coupled between and input voltage and the primary winding;

a secondary side comprising:
   a secondary winding of the transformer, the secondary winding defining a first lead and a second lead;
   a first inductor coupled between the first lead a positive terminal of a voltage output;
   a first current sensor associated with the first inductor and configured to create a signal indicative of current through the first inductor;
   a first freewheeling switch having a control input, the first freewheeling switch coupled between the first lead of the secondary winding and a return terminal of the voltage output;
   a clamp capacitor having a first lead and a second lead, the second lead of the clamp capacitor coupled to the return terminal of the voltage output; and
   a first clamp switch having a control input, the first clamp switch coupled between the first lead of the secondary winding and the first lead of the clamp capacitor;

a converter controller configured to:
   induce a positive voltage and a positive current on the secondary winding of the transformer, the inducing by the bridge circuit;
   create a first ramp signal proportional to the positive current;
   sense the signal indicative of current through the first inductor; and
   change conductive state of the first freewheeling switch and the first clamp switch when a magnitude of the first ramp signal transitions through a magnitude the signal indicative of current through the first inductor.

17. The power converter of claim 16 wherein the converter controller further comprises:

a first amplifier that defines a first input and a first amplifier output, the first input of the first amplifier coupled to the input voltage;

a ramp capacitor coupled to the first amplifier output;

a ramp comparator defining a first input, a second input, and ramp output, the first input coupled to the ramp capacitor, and the second input coupled to the first current sensor;

wherein when the converter controller creates the first ramp signal, the converter controller drives current through the first amplifier to the ramp capacitor, the driving proportional to the input voltage;

wherein when the converter controller changes conductive states of the first freewheeling switch and the first clamp switch, the converter controller asserts the ramp output when the first ramp signal applied to a first input of the ramp comparator transitions through a signal indicative of current through the first inductor from the first current sensor and applied to the second input of the ramp comparator.

18. The power converter of claim 17 wherein the converter controller further comprises:

a second amplifier that defines a first input coupled to the first lead of the clamp capacitor, and a second amplifier output coupled to the ramp capacitor;

an overcurrent comparator having a first input coupled to the ramp capacitor, a second input coupled to a predetermined voltage, and an overcurrent output;

wherein, after the converter controller changes conductive states of the first freewheeling switching and the first clamp switch, the converter controller is further conjured to:

drive current through the second amplifier from the ramp capacitor, the driving proportional to voltage on the clamp capacitor; and de-assert the primary high-drive input to the bridge circuit if the magnitude of the first ramp signal transitions through the predetermined voltage.

19. The power converter of claim 16 wherein the secondary side further comprises:

a second inductor coupled between the second lead of the secondary winding and the positive terminal of the voltage output;

a second current sensor associated with the second inductor and configured to create a signal indicative current through the second inductor;

a second freewheeling switch having a control input, the second freewheeling switch coupled between the second lead of the secondary winding and the return terminal of the voltage output;

a second clamp switch having a control input, the second clamp switch coupled between the second lead of the secondary winding and the first lead of the clamp capacitor;

wherein the converter controller is further configured to:

induce a negative voltage and a negative current on the secondary winding of the transformer, the inducing by the bridge circuit;

create a second ramp signal proportional to the negative current;

sense the signal indicative of current through the second inductor; and change conductive state of the second freewheeling switch and the second clamp switch when a magnitude of the second ramp signal transitions through a magnitude of the signal indicative of current through the second inductor.

20. The power converter of claim 16 wherein the bridge circuit is a half-bridge circuit.

* * * * *